United States Patent
Chai et al.

(10) Patent No.: US 9,771,470 B2
(45) Date of Patent: Sep. 26, 2017

(54) RUBBER POLYMER AND METHOD OF PREPARING THE SAME

(71) Applicant: LG CHEM, LTD., Seoul (KR)

(72) Inventors: Ju Byung Chai, Daejeon (KR); Yu Sung Jung, Daejeon (KR); Eun Seon Park, Daejeon (KR); Tae Young Jeon, Daejeon (KR); Jin Ho Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/764,559

(22) PCT Filed: Apr. 30, 2014

(86) PCT No.: PCT/KR2014/003893
§ 371 (c)(1),
(2) Date: Jul. 29, 2015

(87) PCT Pub. No.: WO2014/178668
PCT Pub. Date: Nov. 6, 2014

(65) Prior Publication Data
US 2016/0053099 A1    Feb. 25, 2016

(30) Foreign Application Priority Data

May 3, 2013 (KR) .................. 10-2013-0050034

(51) Int. Cl.
| *C08L 51/04* | (2006.01) |
| *C08L 51/06* | (2006.01) |
| *C08L 9/10* | (2006.01) |
| *C08F 279/04* | (2006.01) |
| *C08L 55/02* | (2006.01) |
| *C08F 285/00* | (2006.01) |

(52) U.S. Cl.
CPC .............. *C08L 9/10* (2013.01); *C08F 279/04* (2013.01); *C08F 285/00* (2013.01); *C08L 55/02* (2013.01); *C08L 2205/03* (2013.01); *C08L 2207/53* (2013.01)

(58) Field of Classification Search
None
See application file for complete search history.

(56) References Cited

U.S. PATENT DOCUMENTS

| 6,475,608 | B2 * | 11/2002 | Allen | B32B 27/36 |
| | | | | 359/577 |
| 2005/0197462 | A1 * | 9/2005 | Wang | B60C 1/00 |
| | | | | 525/313 |
| 2006/0052515 | A1 * | 3/2006 | Schultes | C08F 285/00 |
| | | | | 524/556 |
| 2006/0079649 | A1 * | 4/2006 | Jung | C08F 2/22 |
| | | | | 525/301 |
| 2006/0147714 | A1 * | 7/2006 | Schultes | C08F 265/04 |
| | | | | 428/407 |
| 2006/0263602 | A1 * | 11/2006 | Choi | C08F 236/10 |
| | | | | 428/407 |
| 2007/0149649 | A1 | 6/2007 | Wang et al. | |
| 2009/0105399 | A1 * | 4/2009 | Schultes | C08L 33/10 |
| | | | | 524/507 |
| 2009/0118438 | A1 * | 5/2009 | Koch | C08G 18/348 |
| | | | | 525/418 |
| 2009/0131607 | A1 * | 5/2009 | Nakanishi | C08G 59/42 |
| | | | | 525/523 |
| 2009/0136774 | A1 * | 5/2009 | Onogi | B32B 27/08 |
| | | | | 428/516 |

FOREIGN PATENT DOCUMENTS

| CN | 101360787 A | 4/2009 |
| JP | 2009-108304 A | 5/2009 |
| KR | 10-2007-0021894 A | 2/2007 |
| KR | 10-2008-0067438 A | 7/2008 |
| KR | 10-2012-0040771 A | 4/2012 |

OTHER PUBLICATIONS

International search report for PCT/KR2014/003893 filed on Apr. 30, 2014.
Office Action from Chinese Patent Office for Application No. 201480010975.0, dated Aug. 8, 2016.

* cited by examiner

*Primary Examiner* — Jeffrey Mullis

(57) ABSTRACT

Disclosed are a rubber latex and a method of preparing the same. The rubber latex comprises a diene based rubber polymer core and a multilayer shell structure wherein an aromatic or non-aromatic polymer having an unsaturated double bond and a diene based polymer are alternatively laminated on the core. When a rubber reinforced graft copolymer is prepared through emulsion polymerization of the rubber latex, a product having excellent impact resistance and colorability may be provided.

17 Claims, No Drawings

RUBBER POLYMER AND METHOD OF PREPARING THE SAME

TECHNICAL FIELD

The present invention relates to a rubber polymer and a method of preparing the same. More particularly, the present invention relates to a rubber polymer, which may implement a product having superior impact resistance and colorability, having a core-shell structure which is composed of a core and at least one shell layer and has a diene based polymer layer as an outermost shell layer, and a method of preparing the same.

BACKGROUND ART

As representative examples of rubber reinforced graft copolymers, particularly rubber reinforced graft copolymers prepared through emulsion polymerization, there are ABS, MBS, ASA, ATM, and the like. The copolymers are prepared by graft copolymerizing a variety of monomers according to dispersibility of a matrix to an outer shell, using a rubber polymer core prepared through general emulsion polymerization. In particular, ABS is prepared by graft copolymerizing a styrene-acrylonitrile copolymer (PSAN) to an outer shell using poly butadiene latex as a core. In particular, ABS products have excellent impact resistance and excellent appearance characteristics such as gloss and colorability and, thus, are broadly used as a material of electronic products, vehicle internal and external materials, and toys requiring a variety of colors and gloss.

Accordingly, many researchers have tried to improve properties such as impact resistance, colorability, and gloss of ABS products. Most researchers focus on improvement of impact resistance, gloss, or the like by applying a variety of initiators or polymerization methods to control the sizes or distribution of rubber particles, or graft ratios. Therefore, research into improvement of colorability is currently lacking. Of course, some researchers improve dispersibility of rubber particles by improving graft efficiency to improve colorability or use different monomer types to control inner refractive indexes of rubber particles. Through such methods, simple core-shell structures are mostly formed, or a diene based monomer and aromatic monomer is copolymerized without a separate core-shell structure. However, when such methods are used, colorability may be partially improved but it is currently difficult to overcome impact resistance decrease due to introduction of a different monomer type.

DISCLOSURE

Technical Problem

Therefore, the present invention has been made in view of the above problems, and it is one object of the present invention to provide a method to simultaneously improve impact resistance and colorability when rubber latex is prepared. More particularly, so as to prepare a rubber reinforced graft copolymer, a multilayer rubber polymer is prepared when rubber latex used as a core is prepared.

The objectives of the present invention will be accomplished by the implementation of the present invention described below.

Technical Solution

In accordance with one aspect of the present invention, provided is a rubber polymer which is composed of a core and at least one shell layer as a core-shell structure and has a diene based polymer layer as an outermost shell layer.

In one embodiment, there may be 2 to 10 shell layers in total.

In one embodiment, the core may have an average diameter of 1000 to 2000 Å.

In one embodiment, the core may be a diene based monomer, or at least one selected from the group consisting of a diene based monomer, a vinyl aromatic monomer, a vinyl cyan-based monomer, and an acrylate based monomer.

In one embodiment, the core and each of the shell layers may have a refractive index difference of 0.02 or less, 0.001 to 0.02, or 0.01 to 0.02.

In another embodiment, refractive index difference between the core and all of the shell layers may be 0.02 or less, 0.001 to 0.02, or 0.01 to 0.02. Within this range, colorability is superior.

In one embodiment, the shell layer may be a non-diene based polymer layer and a diene based polymer layer.

In one embodiment, the amount of each non-diene based polymer layer may be 5 to 15 wt %, or 5 to 10 wt %, based on 100 wt % of the rubber polymer.

In one embodiment, the amount of each of the diene based polymer layer may be 15 to 25 wt %, or 15 to 20 wt %, based on 100 wt % of the rubber polymer.

In one embodiment, the shell layer may be a layer having the non-diene based polymer layer and the diene based polymer layer alternately laminated.

In one embodiment, the rubber polymer may be composed of 40 to 70 wt % of the core and 30 to 60 wt % of the shell layer.

In one embodiment, the core may comprise 30 to 50 wt % of the diene based monomer and 10 to 20 wt % of the vinyl aromatic monomer based on 100 wt % of the rubber polymer.

In one embodiment, the shell layer may comprise $10/N_1$ to $20/N_1$ wt %, where $N_1$ is the number of the non-diene based polymer layers of the non-diene based monomer based on 100 wt % of the rubber polymer.

In another embodiment, the shell layer may comprise $20/N_2$ to $40/N_2$ wt %, where $N_2$ is the number of the diene based polymer layers, of the diene based monomer based on 100 wt % of the rubber polymer.

In one embodiment, the rubber polymer may have an average diameter of 3000 to 3300 Å.

In accordance with another aspect of the present invention, provided is a method of preparing a rubber polymer, the method comprising (a) polymerizing a core polymer or a core-shell copolymer; and (b) forming an outermost shell layer by polymerizing a diene based monomer in the presence of the core polymer or the core-shell copolymer.

In one embodiment, in the method of preparing the rubber polymer, polymerizing the diene based monomer in the forming (b) may be performed when a polymerization transition rate is 70% or more in the polymerizing (a).

In one embodiment, a polymerization transition rate in the polymerizing (a) may be 70 to 95%.

In one embodiment, in the forming (b), a hydrophilic initiator or a lipophilic initiator may be used.

In one embodiment, the hydrophilic or the lipophilic initiator may be used with a redox catalyst.

In one embodiment, the method of preparing the rubber polymer may comprise (1) preparing a core polymer; (2) adding a non-diene based monomer to the core polymer when a polymerization transition rate in the preparing (1) is 70% or more, to prepare a first shell layer; and (3) adding a diene based monomer when a polymerization transition rate in the adding (2) is 70% or more, to prepare an outermost shell layer.

In another embodiment, the method of preparing the rubber polymer may comprise (1) preparing a core polymer; (2) adding a non-diene based monomer to the core polymer when a polymerization transition rate in the preparing (1) is 70% or more, to prepare a first shell layer; (3) adding a diene based monomer when a polymerization transition rate in the adding (2) is 70% or more, to prepare a second shell layer; (4) further adding the non-diene based monomer when a polymerization transition rate in the adding (3) is 70% or more, to prepare a third shell layer; and (5) further adding the diene based monomer when the polymerization transition rate in the further adding (4) is 70% or more, to prepare an outermost shell layer.

In the present invention, the expression "diene based monomer", for example, means a conjugated diene monomer.

In addition, in the present invention, the expression "non-diene based monomer" means a monomer except for diene based monomers. In one embodiment, the non-diene based monomer may be a monomer except for conjugated diene monomers. In another embodiment, the non-diene based monomer may be a vinyl aromatic monomer, a vinyl cyan monomer, an acrylate based monomer, or the like.

In one embodiment, in the step of preparing the shell layer preparing by adding the non-diene based monomer a hydrophobic hydroperoxide-based initiator may be used.

In one embodiment, in the step of adding the non-diene based monomer to prepare a shell layer before adding the monomer, at least one oxidoreductive catalyst selected from the group consisting of ferrous sulfate, dextrose, tetrasodium pyrophosphate, and sodium sulfate may be added.

In accordance with another aspect of the present invention, provided is an ABS resin prepared by graft polymerizing the rubber polymer, the vinyl aromatic monomer, and the vinyl cyan-based monomer.

In accordance with another aspect of the present invention, provided is an ABS resin composition comprising the ABS resin and a matrix resin.

In one embodiment, the matrix resin may be at least one selected from the group consisting of SAN resins, MS resins, PC resins, PBT resins, PVC resins, and the like.

Advantageous Effects

As apparent from the foregoing, the present invention advantageously provides a multilayer rubber polymer for application to a rubber graft copolymer. It can be confirmed that a product having excellent colorability and gloss without reduction of impact resistance may be implemented when the multilayer rubber polymer is applied to a rubber graft copolymer, compared with the cases that only a conventional diene based monomer is applied or an aromatic monomer and a copolymer are applied.

BEST MODE

Compositions of rubber latex and a method of preparing the same are as follows.

Since preparation steps described in the present invention are merely exemplary embodiments, each step is not necessary to be clearly distinguished for polymerization and polymerization may be continuously carried out.

Therefore, the present inventors repeatedly conducted research to provide technology to secure excellent colorability without loss of impact resistance which is a characteristic of ABS. As a result, the inventors confirmed that excellent colorability may be implemented without reduction of impact resistance when the rubber polymer is laminated to a multilayer structure having refractive index difference of a constant range at a preparation process of the rubber polymer, thus completing the present invention.

The composition of the present invention will be described in detail as follows.

A) Rubber Polymer and Preparation of the Same

The compositions of the multilayer rubber polymer and the method of preparing the same suggested in the present invention are as follows.

In one embodiment, the rubber polymer according to the present invention comprises the diene based rubber polymer core having an average diameter of 1500 to 2000 Å; and a multilayer shell structure, in which 5 to 10 wt % of an aromatic or non-aromatic polymer having an unsaturated double bond and 10 to 20 wt % of a diene based polymer are alternatively laminated, formed on the core.

In the present invention, the expression "wt %" is based on 100 wt % of the rubber polymer.

In the present invention, the total amount of a monomer composing the rubber polymer, for example, means the total amount of the monomer or rubber polymer added when the rubber polymer is prepared.

In one embodiment, the diene based rubber polymer core may have an average diameter of 1500 to 2000 Å.

In one embodiment, the amount of the aromatic or non-aromatic polymer having an unsaturated double bond of the shell may be 10 to 20 wt % or 15 to 25 wt %.

In one embodiment, the amount of the diene based polymer of the shell may be 20 to 30 wt % or 30 to 40 wt %.

In one embodiment, the multilayer shell structure may be a 2 layer or more structure. In another embodiment, the multilayer shell structure may be a 2 to 10 layer structure or a 2 to 4 layer structure.

In another embodiment, the multilayer shell structure may be a 2n layer structure, where n is 1 to 5 or 1 to 2.

In addition, the present invention provides the method of preparing the rubber polymer, the method comprising polymerizing the diene based monomer having an average diameter of 1500 to 2000 Å to prepare the diene based rubber polymer core, and alternatively laminating the shell layer (non-diene based polymer layer), in which 5 to 10 parts by weight of the aromatic or non-aromatic monomer having an unsaturated double bond is polymerized, and the shell layer (diene based polymer layer), in which 10 to 20 parts by weight of the diene based monomer is polymerized, on the core, to prepare the multilayer shell structure.

In one embodiment, the present invention provides a method of preparing rubber latex, the method comprising polymerizing 40 to 70 parts by weight of the diene based monomer to prepare the diene based rubber polymer core having an average diameter of 1500 to 2000 Å, adding 5 to 10 parts by weight of the aromatic or non-aromatic monomer to the core having the unsaturated double bond when a polymerization transition rate is 70% or more, to prepare a first shell, adding 10 to 20 parts by weight of the diene based monomer when a polymerization transition rate of the added monomer is 70% or more, to prepare a second shell; and further adding 5 to 10 parts by weight of the aromatic or non-aromatic monomer having an unsaturated double bond when a polymerization transition rate is 70% or more, to prepare a third shell.

In one embodiment, when the polymerization transition rate is 75 to 95% or 80 to 95%, the first shell may be prepared by adding 5 to 10 parts by weight of the aromatic or non-aromatic monomer having the unsaturated double bond to the core.

In addition, in another embodiment, when the polymerization transition rate of the added monomer is 75 to 95% or 75 to 90%, the second shell may be prepared by adding 10 to 20 parts by weight of the diene based monomer.

In addition, when the polymerization transition rate is 75 to 95% or 80 to 95%, the third shell may be prepared by adding 5 to 10 parts by weight of the aromatic or non-aromatic monomer having the unsaturated double bond.

When the polymerization transition rate of the monomer added in the step of preparing the third shell is 70% or more, a forth shell may be prepared by further adding 10 to 20 parts by weight of the diene based monomer.

In one embodiment, the rubber polymer of the present invention may be obtained in a form of latex.

In one embodiment, a solid content of the latex may be 35 to 60 wt %.

The amount of the diene based monomer, a particle size of the diene based rubber polymer core, the amount of the aromatic or non-aromatic polymer, which has the unsaturated double bond, on the core, and the amount of the core diene based polymer on the core are identical to those disclosed above.

In another embodiment of the present invention, the first shell is prepared by adding 0.1 to 1.5 parts by weight of an emulsifier, 0.01 to 2.0 parts by weight of a polymerization initiator, 0.01 to 0.4 parts by weight of a molecular weight regulator, and 0.1 to 2.0 parts by weight of an electrolyte at the same time, based on 40 to 70 parts by weight of the diene based monomer and adding 5 to 10 parts by weight of the aromatic or non-aromatic monomer having an unsaturated double bond when a particle size is 1500-2000 Å and a polymerization transition rate is 70% or more, and then the second shell is formed by adding 10 to 20 parts by weight of the diene based monomer when a polymerization transition rate of the added monomer reaches 70% or more. Subsequently, when a polymerization transition rate reaches 70% or more, the third shell is formed by further adding 5 to 10 parts by weight of the aromatic or non-aromatic monomer having the unsaturated double bond. Subsequently, 10 to 20 parts by weight of the diene based monomer is lastly added when the polymerization transition rate is 70% or more and reaction is continued until a reaction transition rate reaches 90 to 95%. A particle size of a resultant final polymer is 3000~3300 Å and the amount of a solid of the polymer is less than 0.003% based on the total amount of added solid.

In one embodiment, with the diene based monomer, based on 100 parts by weight of the monomer which composes the rubber polymer, 0.5 to 1.5 parts by weight of an emulsifier, 0.01 to 1.5 parts by weight of the polymerization initiator, 0.05 to 0.4 parts by weight of a molecular weight regulator, and 0.5 to 2.0 parts by weight of an electrolyte may be added. Alternatively, 0.5 to 1.0 parts by weight of an emulsifier, 0.01 to 1.0 part by weight of a polymerization initiator, 0.1 to 0.4 parts by weight of a molecular weight regulator, and 1.0 to 2.0 parts by weight of an electrolyte may be added.

In this regard, preferably, the diene based monomer is added batchwise in the initial step and is continuously added in the subsequent step to prepare the shell. In addition, to further improve polymerization stability and the polymerization transition rate in each of the steps, 0.1 to 0.5 parts by weight of the emulsifier, 0.01 to 0.05 parts by weight of the polymerization initiator, and 1 to 5 parts by weight of ion exchange water may be added batchwise or continuously.

In this regard, the diene based monomer, for example, may be a monomer such as 1,3-butadiene, isoprene, 2-chloroprene, or the like.

The aromatic monomer (vinyl aromatic monomer) having an unsaturated double bond, for example, may be a monomer such as styrene, alpha-methyl styrene, chlorostyrene, vinyl toluene, or the like.

The non-aromatic monomer, which is not specifically limited, for example, may be an acrylic acid ester-based monomer such as methyl acrylate, ethyl acrylate, butyl acrylate, 2-ethylhexyl acrylate, or the like; a vinyl cyan-based monomer such as acrylonitrile, methacrylonitrile, malononitrile, or the like; and an unsaturated carboxylic acid-based monomer such as acrylic acid, maleic acid, methacrylic acid, itaconic acid, fumaric acid, or the like. In particular, the non-aromatic monomer may be methyl acrylate, acrylonitrile, acrylic acid, or the like.

The acrylate based monomer of the present invention, for example, may comprise a (meth)acrylic acid ester-based monomer, an unsaturated carboxylic acid-based monomer, and the like.

The aromatic and non-aromatic monomer, which is not specifically limited, may be used alone or as a mix of two types thereof.

In one embodiment, refractive index difference between the core and each of the shell layers in the rubber polymer may be 0.02 or less, 0.001 to 0.02, or 0.01 to 0.02. Within this range, excellent colorability is exhibited.

In another embodiment, refractive index difference between the core and all of the shell layers in the rubber polymer may be 0.02 or less, 0.001 to 0.02, or 0.01 to 0.02. Within this range, excellent colorability is exhibited.

Refractive indexes of the core and each of the shell layers may be 1.518 to 1.590, or 1.518 to 1.560. Within this range, excellent colorability is exhibited.

In the present invention, the refractive index, for example, may be calculated according to Mathematical Equation 1 below.

$$\text{Refractive index} = (\text{refractive index of } I \text{ ingredient}) * (\text{fraction of } I \text{ ingredient}) + (\text{refractive index of } j \text{ ingredient}) * (\text{fraction of } j \text{ ingredient}) \quad [\text{Mathematical Equation 1}]$$

The ingredients, for example, may be monomers.

The fractions of the ingredients may be a content ratio of a corresponding ingredient with respect to the total amount of all added ingredients.

The emulsifier used in the preparation step, which is not specifically limited, may be an emulsifier having a sulfonate terminal group generally used or an emulsifier having a carboxylic acid terminal. In addition, a nonionic emulsifier and a reactive emulsifier may be used alone or as a mixture thereof.

When the polymerization transition rate of the diene based monomer is 70 to 95%, the aromatic or non-aromatic monomer having an unsaturated double bond may be continuously added.

Additionally, when the monomer is added, an ingredient composed of 0.1 to 1.5 parts by weight of the emulsifier, 0.01 to 2.0 parts by weight of the polymerization initiator, 0.1 to 10 parts by weight of the ion exchange water may be added at the same time or continuously as an emulsion type. The added polymerization initiator and emulsifier, and ion exchange water may be separately added. Preferably, the ingredients are continuously added as an emulsion, in which all of the ingredients are mixed, to alleviate rapid heating reaction during polymerization and secure polymerization stability.

In one embodiment, 0.5 to 1.5 parts by weight of the emulsifier, 0.01 to 1.5 parts by weight of the polymerization initiator, and 0.5 to 10 parts by weight of the ion exchange water may be added, or 0.5 to 1.0 part by weight of the emulsifier, 0.01 to 1.0 part by weight of the polymerization initiator, and 1 to 5 parts by weight of the ion exchange water may be added.

The parts by weight are based on 100 parts by weight of the monomer used to prepare the rubber polymer.

The polymerization initiator used in the present invention, for example, may be a thermal decomposition initiator such as potassium persulfate, ammonium persulfate, or sodium persulfate, as persulfate based initiators having strong hydrophilic properties. Alternatively, as the polymerization initiator, a hydroperoxide based initiator such as diisopropylbenzene hydroperoxide, cumene hydroperoxide, or t-butyl hydroperoxide having hydrophobic properties may be used with an oxidoreductive catalyst, which is generally applied, such as ferrous sulfate, dextrose, tetrasodium pyrophosphate, sodium sulfate, or the like. Preferably, an initiator having hydrophilic properties is used in a seed polymerization step and when the diene based monomer is used. In addition, when the aromatic or non-aromatic monomer having an unsaturated double bond is applied, a hydrophobic initiator is preferably used alone or with an oxidation-reduction catalyst.

When the aromatic or non-aromatic monomer having the unsaturated double bond is added, a hydrophobic hydroperoxide-based initiator selected from the group consisting of, for example, diisopropylbenzene hydroperoxide, cumene hydroperoxide, and t-butyl hydroperoxide is used. In addition, when the diene based monomer is continuously added in the step of polymerizing the shells, at least one hydrophilic initiator selected from the group consisting of potassium persulfate, ammonium persulfate, and sodium persulfate may be used.

When the hydrophobic initiator is applied, at least one oxidoreductive catalyst selected from the group consisting of, for example, ferrous sulfate, dextrose, tetrasodium pyrophosphate, and sodium sulfate may be added at the same time for polymerization before continuous addition of the monomer.

As the electrolyte used to prepared the rubber latex of the present invention, for example, KCl, $CHCO_3$, $Na_2CO_3$, $NaHSO_4$, or a mixture thereof may be used in an amount of 0.1 to 2 parts by weight, preferably 0.5 to 1.5 parts by weight.

As the molecular weight regulator used in polymerization, for example, a mercaptan such as n-dodecyl mercaptan, n-decyl mercaptan, t-dodecyl mercaptan, or the like, or an alpha methyl styrene dimer, which may be used in general emulsion polymerization, may be used. In one embodiment, the molecular weight regulator is preferably used in an amount of 0.1 to 0.4 parts by weight based on 100 parts by weight of the monomer. When the molecular weight regulator is used in an amount of less than 0.1 parts by weight, a polymerization rate is decreased and a degree of cross-linking of the rubber polymer increases. Accordingly, impact strength of an impact resistant material may be reduced. On the other hand, when the molecular weight regulator is used in an amount of greater than 0.4 parts by weight, polymerization rate is reduced in the late stage of reaction and, thus, productivity is decreased. In addition, a remainder of the molecular weight regulator may cause unpleasant smell and gas generation.

B) Preparation of Rubber Reinforced Graft Copolymer

A method of preparing a rubber reinforced graft copolymer by emulsion polymerizing the rubber polymer prepared through the method will be described in detail.

In one embodiment, the graft copolymer according to the present invention is prepared by emulsion polymerizing a monomer comprising 30 to 50 wt % of at least one selected from the group consisting of a vinyl aromatic monomer, a vinyl cyan-based monomer, and a (methyl)acrylic acid ester monomer, based on 50 to 70 wt % of the rubber polymer.

In one embodiment, based on 100 wt % of the monomer (except for the amount of rubber polymer), a vinyl cyan-based monomer and/or (meth)acrylic acid ester monomer may be used in an amount of 10 to 40 wt %.

In one embodiment, the vinyl aromatic monomer, for example, may be styrene or a styrene derivative. In another embodiment styrene, α-methylstyrene, o-methylstyrene, o-ethylstyrene, p-ethylstyrene, vinyl toluene, or the like may be used. As the vinyl cyan-based monomer, for example, a monomer such as acrylonitrile, methacrylonitrile, or the like may be used. As the methacrylic acid ester monomer, for example, methyl methacrylate, ethyl methacrylate, or the like may be used. As the acrylic acid ester monomer, for example, a monomer such as methyl acrylate, ethyl acrylate, butyl acrylate, or the like may be used.

In one embodiment, the method of emulsion polymerizing the graft copolymer according to the present invention, which is not specifically limited, may be carried out by adding 30 to 50 wt % of a monomer to form a graft copolymer, with an emulsifier, a molecular weight regulator, a graft supplement, and an initiator, based on 50 to 70 wt % of the rubber polymer and finishing after maintaining a reaction until a reaction transition rate reaches 98 to 99%.

In this regard, as the emulsifier, for example, an absorption type emulsifier of a carboxylate type such as rosin acid potassium, fatty acid potassium, or the like, a sulfonate-based absorption-type emulsifier such as sodium lauryl sulfate, alkyl benzene sulfonate, or the like, or a reactive emulsifier may be used alone or as a mixture thereof.

As the molecular weight regulator to prepare the graft copolymer, for example, a molecular weight regulator such as n-dodecyl mercaptan, n-decyl mercaptan, t-dodecyl mercaptan, an alpha methyl styrene dimer, or the like may be used. In particular, 0.2 to 1.0 part by weight of t-dodecyl-mercaptan is preferable. Here, the parts by weight are based on 100 parts by weight of the rubber polymer and the monomer.

The initiator may be used in an amount of 0.01 to 1 parts by weight and a type thereof is not specifically limited. For example, when a peroxide initiator such as t-butyl hydroperoxide, cumene hydroperoxide, diiso propylbenzene hydroperoxide, or the like is used with the oxidoreductive catalyst, impact resistance and latex stability may be advantageously obtained during graft copolymerization.

In addition, during preparation of the graft copolymer, each monomer may be directly added, a mixture of monomers may be added, or a monomer emulsion prepared by mixing an emulsifier, water, and an initiator may be added, to the reactor. When the monomer is added, 0 to 20 wt % or 1 to 20 wt % of the monomer may be sequentially added in the initial stage of reaction and the reminder of the monomer may be continuously added, based on 100 wt % of the monomer. In addition, the total amount of the monomer may be continuously added or added in three batches.

To isolate a solid from the reacted graft copolymer, an antioxidant and thermal stabilizer are added, and then an acid such as sulfuric acid, hydrochloric acid, phosphoric acid, acetic acid, or the like, or a metal salt such as calcium chloride, sulfuric acid magnesium, sulfuric acid aluminum, or the like is used. The solid is agglomerated by the acid and, thus, may be isolated. The solid may be formed into a powder through washing, dehydrating, and drying. A resultant powder type graft copolymer may be used with a thermoplastic resin copolymer which is generally prepared through solution polymerization.

C) Preparation of Rubber Reinforced Thermoplastic Resin Composition

The graft copolymer according to the method described above is processed in a pellet type by melting and mixing through a general extrusion process with a thermoplastic resin, resulting in preparation of a final rubber reinforced thermoplastic resin. In this regard, as the thermoplastic resin, a resin such as styrene-acrylonitrile copolymer (SAN), acrylonitrile-styrene-methylmethacrylate (MS resin), polycarbonate (PC), polybutylene terephthalate (PBT), or polyvinyl chloride (PVC) is generally used. A used resin type is not specifically limited and a variety of resins may be freely used in cases requiring impact resistance.

In addition, the graft copolymer may be used with a thermoplastic resin (B); a lubricant and thermal stabilizer used in melt molding through extrusion and injection processes; and additives for other processes. Types of the added materials are not specifically limited.

The rubber reinforced thermoplastic resin composition prepared according to the method has excellent colorability without reduction of impact resistance, when compared with a conventional method.

Now, the present invention will be described in more detail with reference to the following examples. These examples are provided only for illustration of the present invention and should not be construed as limiting the scope and spirit of the present invention.

EXAMPLE

Example 1

Preparation of Rubber Latex (A1)

To a pressurized reactor filled with nitrogen, 50 parts by weight of ion exchange water was added, and then 0.5 parts by weight of rosin acid potassium, 40 parts by weight of 1,3-butadiene, 0.3 parts by weight of t-dodecylmercaptan, 1.0 part by weight of potassium carbonate, and 0.1 parts by weight of potassium persulfate were added at room temperature and stirred for 1 hour. Subsequently, reaction temperature was elevated to 70° C. and reaction was continued for 5 hours. When a reaction polymerization transition rate reached 90% and a particle diameter reached 2000 Å, a solution (oxidation-reduction Solution A) composed of 0.0005 parts by weight of ferrous sulfide, 0.05 parts by weight of dextrose, 0.04 parts by weight of tetrasodium pyrophosphate, and 2 parts by weight of ion exchange water was added at the same time, and then, 10 parts by weight of a styrene monomer was continuously added with an emulsion (Initiator Emulsion B) composed of 0.5 parts by weight of rosin acid potassium, 0.2 parts by weight of t-butyl hydroperoxide, and 5 parts by weight of ion exchange water over 2 hours to the reactor. Subsequently, when a polymerization transition rate of the monomer reached 90%, 20 parts by weight of 1,3-butadiene monomer was continuously added through 4 hours to the reactor while maintaining the reaction. When the polymerization transition rate reached 80%, oxidation-reduction Solution A was added to the reactor at the same time. Subsequently, 10 parts by weight of a styrene monomer was continuously added with Initiator Emulsion B over 22 hours to the reactor and the reaction was maintained until a polymerization transition rate reached 90%. Finally, 20 parts by weight of a 1,3-butadiene monomer was added over 4 hours to the reactor. Subsequently, a reaction temperature was elevated to 80° C. and reaction was continued for 4 more hours. After terminating the reaction, properties were measured. As results, a polymerization transition rate was approximately 95% and a particle diameter was 3200 Å. Detailed properties are summarized in Table 1.

Example 2

Preparation of Rubber Latex (A2)

To a pressurized reactor filled with nitrogen, 50 parts by weight of ion exchange water was added, and then 0.5 parts by weight of rosin acid potassium, 40 parts by weight of 1,3-butadiene, 0.3 parts by weight of t-dodecylmercaptan, 1.0 part by weight of potassium carbonate, and 0.1 parts by weight of potassium persulfate were added at room temperature and stirred for 1 hour. Subsequently, reaction temperature was elevated to 70° C. and reaction was continued for 5 hours. When a reaction polymerization transition rate reached 90% and a particle diameter reached 2000 Å, a solution (Oxidation-reduction Solution A) composed of 0.0005 parts by weight of ferrous sulfide, 0.05 parts by weight of dextrose, 0.04 parts by weight of tetrasodium pyrophosphate, and 2 parts by weight of ion exchange water were added at the same time, and then, 7.5 parts by weight of a styrene monomer and 2.5 parts by weight of acrylonitrile were continuously added with an emulsion (Initiator Emulsion B) composed of 0.5 parts by weight of rosin acid potassium, 0.2 parts by weight of t-butyl hydroperoxide, and 5 parts by weight of ion exchange water over 2 hours to the reactor. Subsequently, when a polymerization transition rate of the monomer reached 90%, 20 parts by weight of 1,3-butadiene monomer was continuously added over 4 hours to the reactor while continuing the reaction. When the polymerization transition rate reached 80%, Oxidation-reduction Solution A was added to the reactor at the same time. Subsequently, 7.5 parts by weight of a styrene monomer and 2.5 parts by weight of acrylonitrile were continuously added with Initiator Emulsion B over 22 hours to the reactor and reaction was continued until a polymerization transition rate reached 90%. Finally, 20 parts by weight of a 1,3-butadiene monomer was added over 4 hours to the reactor. Subsequently, a reaction temperature was elevated to 80° C. and the reaction was continued for another 4 hours. After terminating the reaction, properties were measured. As results, a polymerization transition rate was approximately 94% and a particle diameter was 3100 Å. Detailed properties are summarized in Table 1.

Comparative Example 1

Preparation of Rubber Latex (B1)

To a pressurized reactor filled with nitrogen, 50 parts by weight of ion exchange water was added, and then 1.5 parts by weight of rosin acid potassium, 100 parts by weight of 1,3-butadiene, 0.3 parts by weight of t-dodecyl mercaptan, 1.0 part by weight of potassium carbonate, and 0.1 parts by weight of potassium persulfate were added at room temperature and stirred for 1 hour. Subsequently, reaction temperature was elevated to 70° C. and the reaction was maintained for 5 hours. Subsequently, 0.5 parts by weight of rosin acid potassium and 0.2 parts by weight of potassium persulfate were added to the reactor at the same time and then reaction was continued for another 8 hours. When a polymerization transition rate reached 80%, reaction temperature was elevated to 80° C., and 0.5 parts by weight of rosin acid potassium and 0.2 parts by weight of potassium persulfate were additionally added to the reactor and the reaction was further maintained for 8 hours. After terminating the reaction, properties were measured. As results, a polymerization transition rate was 93% and a particle diameter was 3100 Å. Detailed properties are summarized in Table 1.

Comparative Example 2

Preparation of Rubber Latex-B2

To a pressurized reactor filled with nitrogen, 50 parts by weight of ion exchange water was added, and then 1.5 parts by weight of rosin acid potassium, 80 parts by weight of 1,3-butadiene, 20 parts of by weight of styrene, 0.3 parts by weight of t-dodecyl mercaptan, 1.0 part by weight of potassium carbonate, and 0.1 parts by weight of potassium persulfate were added at room temperature and stirred for 1 hour. Subsequently, reaction temperature was elevated to 70° C. and the reaction was maintained for 5 hours. Subsequently, 0.5 parts by weight of rosin acid potassium and 0.2 parts by weight of potassium persulfate were added to the reactor at the same time and then reaction was continued for more 8 hours. When a polymerization transition rate reached 80%, reaction temperature was elevated to 80° C., 0.5 parts by weight of rosin acid potassium and 0.2 parts by weight of potassium persulfate were additionally added to the reactor and reaction was continued for more 8 hours. After terminating the reaction, properties were measured. As results, a polymerization transition rate was approximately 94% and a particle diameter was 3000 Å. Detailed properties are summarized in Table 1.

Preparation of Graft Copolymer 60 parts by weight of the rubber polymer prepared according to each of Examples 1 and 2 and Comparative Examples 1, 60 parts by weight of ion exchange water, 0.2 parts by weight of alkenyl succinic acid potassium (product name: Latemul ASK), 7.2 parts by weight of styrene, and 2.8 parts by weight of acrylonitrile were added to a pressurized reactor filled with a nitrogen atmosphere and sufficiently stirred at 25° C. Subsequently, temperature was elevated to 50° C. Subsequently, 0.08 parts by weight of t-butyl hydroperoxide and 0.003 parts by weight of ferric phate, 0.005 parts by weight of dextrose, 0.025 parts by weight of tetrasodium pyrophosphate, and 2.5 parts by weight of ion exchange water were added to the reactor, and reaction was carried out for 1 hour while elevating reaction temperature to 65° C. Subsequently, an emulsion composed of 0.3 parts by weight of alkenyl succinic acid potassium, 21.6 parts by weight of styrene, 8.4 parts by weight of acrylonitrile, 0.4 parts by weight of t-dodecylmercaptan, 0.1 parts by weight of diisopropyl benzene peroxide, and 20 parts by weight of ion exchange water was continuously added to the reactor for 1 hour. Subsequently, 0.05 parts by weight of cumene hydroperoxide, 0.003 parts by weight of ferrous sulfide, 0.005 parts by weight of dextrose, 0.025 parts by weight of tetrasodium pyrophosphate, and 2.5 parts by weight of ion exchange water were additionally added to the reactor and the reaction was maintained for 1 hour while elevating polymerization temperature to 80° C.

Preparation of Rubber Reinforced Thermoplastic Resin 76 parts by weight of a styrene-acrylonitrile copolymer resin (92HR-LG chemistry), 1.5 parts by weight of a lubricant, and 0.2 parts by weight of a first thermal stabilizer were added with respect to 24 parts by weight of the graft copolymer (B-1) prepared through a polymerization drying process, and extrusion was performed at 200° C. temperature. Subsequently, injection was performed at the same temperature and a sample was prepared to evaluate properties. The evaluated properties are summarized in Table 1.

Test Example

Properties of the rubber polymer, graft copolymer, and rubber reinforced thermoplastic resin composition prepared according to each of Examples 1 and 2 and Comparative Examples 1 and 2 were measured according to methods below. Results are summarized in Table 1 below.

[Property Measurement Methods]

Average diameter: An average particle diameter (Nicomp average particle diameter) was measured using a Nicomp instrument.

Polymerization congelation: Latex prepared through emulsion polymerization was filtered through a 100-mesh wire net filter and then a polymer filtered on the wire net was dried in a 100° C. hot-air drier for 1 hour. A content of the polymerization congelation was represented by a ratio with respect to a theoretical total amount of the added monomer and additives (emulsifier and the like).

Polymerization transition rate: measured using Mathematical Equation 2 below.

$$\text{Polymerization transition rate} = (A) \times (C/B) - (D) \quad [\text{Mathematical Equation 2}]$$

A: the part of all materials added for polymerization, based on 100 weight (g) of the monomer B: the weight (g) of latex sampled during polymerization C: the weight (g) of a solid remaining after drying the sampled latex of B in a 150° C. oven for 15 minutes D: the part of the materials added in A, excluding water and a monomer, based on 100 weight (g) of the monomer Refractive index: A refractive index of a monomer was measured using an ABBE refractor. A refractive index of each of a core and shells was calculated by multiplying a refractive index of each monomer by a fraction of each monomer and then summing all resultant values.

Izod impact strength: Measured according to ASTM D256 using a sample having a thickness of ¼". A unit thereof was kg·cm/cm.

Tensile strength: Measured under a condition of 50 mm/min according to ASTM D638. A unit thereof was kg/cm².

Gloss: A pellet obtained using an extruder was injected at 200° C. Gloss of a resultant sample was measured under a 20 degree light source.

Colorability: A colorant (RED COLOR: RD-31) was added to a pellet obtained using an extruder and then re-extruded. To find an L value and a value of a resultant sample, COLOR COMPUTER (available from SUGA) was used. Generally, in the case of a colorant, RED COLOR, colorability is judged to be satisfactory when the L value is low and the a value is high.

Fluidity: was measured under conditions of 220° C. and 10 kg.

TABLE 1

|  |  |  | Example 1 | Example 2 | Comparative Example 1 | Comparative Example 2 |
|---|---|---|---|---|---|---|
| Rubber polymer | Core | Composition | BD | BD | BD | BD/ST |
|  |  | Parts by weight | 40 | 40 | 100 | 80/20 |
|  | Shell | Composition | ST*/BD*/ST/BD | SAN*/BD/SAN/BD | — | — |
|  |  | Parts by weight | 10/20/10/20 | 10/20/10/20 | 93 | 94 |
|  |  | Polymerization transition rate(%) | 95 | 94 | 93 | 94 |
|  |  | Particle size | 3200 | 3100 | 3100 | 3000 |
| Rubber reinforced thermoplastic resin composition |  | Impact strength (¼") | 32 | 31 | 30 | 24 |
|  |  | Fluidity | 21 | 21 | 20 | 22 |
|  |  | Gloss (45 degree) | 102 | 100 | 100 | 98 |
|  |  | Tensile strength | 475 | 480 | 470 | 490 |
|  |  | Colorability(L) | 31.5 | 30.2 | 32.5 | 32.4 |
|  |  | Colorability(a) | 46.5 | 46.2 | 45.0 | 45.5 |

*ST: styrene
*BD: 1,3-butadiene
*SAN: styrene-acrylonitrile

It can be confirmed that the rubber reinforced thermoplastic resin composition prepared using the rubber latex of each of Examples 1 to 2 of the present invention has excellent impact strength, colorability (due to the low L values and high values of Examples 1 and 2), and property balance, when compared with the rubber reinforced thermoplastic resin composition prepared from the rubber latex of each of Comparative Examples 1 and 2.

What is claimed is:

1. A rubber polymer, comprising:
    a core comprising a diene based first monomer; and
    a shell structure coupled to the core, the shell structure including a first shell layer and a second shell layer, the first shell layer including a non-diene based second monomer, the second shell layer including a diene-based third monomer,
    wherein the second shell layer is an outermost layer of the shell structure, and
    wherein an amount of each layer that is in the shell structure and that includes a diene-based monomer is 15 to 25 wt %, based on 100 wt % of the rubber polymer.

2. The rubber polymer according to claim 1, wherein the shell structure includes 4 to 10 layers.

3. The rubber polymer according to claim 1, wherein refractive index difference between the core and each of the first and second shell layers is 0.02 or less.

4. The rubber polymer according to claim 1, wherein an amount of the first shell layer is 5 to 15 wt %, based on 100 wt % of the rubber polymer.

5. The rubber polymer according to claim 1, wherein the shell structure comprises at least one non-diene based polymer layer alternately laminated with at least one diene based polymer layer.

6. The rubber polymer according to claim 1, wherein 40 to 70 wt % of the rubber polymer is the core and 30 to 60 wt % of the rubber polymer is the shell structure, based on 100 wt % of the rubber polymer.

7. The rubber polymer according to claim 1, wherein the core comprises 30 to 50 wt % of the first monomer and 10 to 20 wt % of a fourth monomer, based on 100 wt % of the rubber polymer, the fourth monomer being a vinyl aromatic monomer.

8. The rubber polymer according to claim 1, wherein the shell structure comprises 10/N1 to 20/N1 wt % of a non-diene based monomer, and
    wherein N1 is a number of non-diene based polymer layers in the shell structure based on 100 wt % of the rubber polymer.

9. The rubber polymer according to claim 1, wherein the shell structure comprises 20/N2 to 40/N2 wt % of a diene based monomer, and
    wherein N2 a number of diene based polymer layers in the shell structure based on 100 wt % of the rubber polymer.

10. A method of preparing the rubber polymer of claim 1, the method comprising:
    (a) polymerizing a core polymer or a core-shell copolymer; and
    (b) forming an outermost shell layer by polymerizing the diene based third monomer in the presence of the core polymer or the core-shell copolymer, the outermost shell layer being the second shell layer.

11. The method according to claim 10, wherein the outermost shell layer is formed by adding the third monomer for polymerization.

12. The method according to claim 10, wherein, the outermost shell layer is formed using a hydrophilic initiator.

13. The method according to claim 10, further comprising:
    (1) preparing the core polymer;
    (2) preparing the first shell layer by adding the non-diene based second monomer to the core polymer; and
    (3) preparing the second shell layer by adding the diene based third monomer.

14. The method according to claim 10, further comprising:
    (1) preparing the core polymer;
    (2) preparing the first shell layer by adding the non-diene based second monomer to the core polymer;
    (3) preparing a third shell layer by adding the diene based third monomer;

(4) preparing a fourth shell layer by further adding the non-diene based second monomer; and (5) preparing the second shell layer by further adding the diene based third monomer.

15. An ABS resin prepared by graft polymerizing the rubber polymer of claim 1, a vinyl aromatic monomer, and a vinyl cyan-based monomer.

16. A rubber polymer, comprising:
a core comprising a diene-based first monomer, the first monomer being a diene-based monomer; and
a shell structure coupled to the core, the shell structure including a first shell layer and a second shell layer, the first shell layer including a non-diene based second monomer, the second shell layer including a diene-based third monomer,
wherein the second shell layer is an outermost layer of the shell structure, and
wherein an amount of each layer that is in the shell structure and that includes a non-diene-based monomer is 5 to 15 wt %, based on 100 wt % of the rubber polymer.

17. A rubber polymer, comprising:
a core comprising a diene-based first monomer; and
a shell structure coupled to the core, the shell structure including a first shell layer and a second shell layer, the first shell layer including a non-diene based second monomer, the second shell layer including a diene-based third monomer,
wherein the second shell layer is an outermost layer of the shell structure,
wherein the shell structure comprises a plurality of third layers including the non-diene based second monomer, the first layer being one of the plurality of third layers, and
wherein the shell structure comprises 10/N1 to 20/N1 wt % of each of the third layers, N1 being a number of the plurality of third layers, based on 100 wt % of the rubber polymer.

* * * * *